United States Patent
Kobayashi

(10) Patent No.: US 7,051,214 B2
(45) Date of Patent: May 23, 2006

(54) INFORMATION PROCESSING SYSTEM HAVING FORTIFIED PASSWORD FUNCTION AND METHOD THEREOF

(75) Inventor: Takashi Kobayashi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1073 days.

(21) Appl. No.: 09/842,187

(22) Filed: Apr. 26, 2001

(65) Prior Publication Data

US 2002/0129284 A1    Sep. 12, 2002

(30) Foreign Application Priority Data

Mar. 12, 2001    (JP)    ............... 2001-068931

(51) Int. Cl.
*H04L 9/32*    (2006.01)

(52) U.S. Cl. ...................... 713/202; 713/183

(58) Field of Classification Search ........ 713/183–184, 713/202; 340/5.85; 708/135–136
See application file for complete search history.

(56) References Cited

U.S. PATENT DOCUMENTS

| | | | | |
|---|---|---|---|---|
| 5,402,492 | A * | 3/1995 | Goodman et al. .......... | 713/202 |
| 5,485,622 | A * | 1/1996 | Yamaki ...................... | 713/200 |
| 5,923,843 | A * | 7/1999 | Vaughan et al. ............ | 713/202 |
| 6,108,785 | A * | 8/2000 | Poisner ....................... | 713/200 |
| 6,630,928 | B1 * | 10/2003 | McIntyre et al. ........... | 345/173 |
| 6,647,498 | B1 * | 11/2003 | Cho ............................ | 713/202 |

OTHER PUBLICATIONS

Solomon et al, "Inside Microsoft Windows 2000", 2000, Microsoft Press, 3rd Edition, pp. 521-526.*

* cited by examiner

Primary Examiner—Gilberto Barrón, Jr.
Assistant Examiner—Minh Dinh
(74) Attorney, Agent, or Firm—Wenderoth, Lind & Ponack, L.L.P.

(57) ABSTRACT

An information processing system has a main unit, an input device detachable from the main unit, a storage device for storing a startup password set by the input device, a startup password presence checking portion for determining whether or not the startup password is stored, and a startup password request portion for requesting an operator to set a startup password. The startup password request means: (i) requests the setting of the startup password with input unit for starting the main unit, if the input unit is connected to the main unit, and when the startup password is absent, (ii) makes the main unit start, if the input unit is connected to the main unit, and when the startup password is found present, and (iii) makes the main unit start regardless of the presence or absence of the startup password, if the input unit is not connected to the main unit.

17 Claims, 2 Drawing Sheets

INFORMATION PROCESSING SYSTEM HAVING FORTIFIED PASSWORD FUNCTION AND METHOD THEREOF

BACKGROUND OF THE INVENTION

1. Field of the Invention

The present invention relates to an information processing system and a method of processing the information, and more specifically it relates to a technique of processing information to improve benefit and convenience of the operator, and to ensure security of the recorded information.

2. Description of the Prior Art

With the wide use of information processors in recent years, the value of information itself recorded in secondary memories is becoming far greater than the value of main bodies of the information processors. Since the secondary memories are generally removable, there is a risk that the information recorded thereon will be used illegitimately by third parties who have stolen the secondary memories. Thus, there are demands for security techniques that render the information in the secondary memories not readable by even the third parties who have stolen them.

Information processors and information processing systems of the prior art, when stolen, can be disassembled so as to take out the secondary memories therefrom. When this happens, the information is not prevented from being used illegitimately by means of only a password at startup if the removed secondary memories is connected to another information processor and used wrongfully. For this reason, in the conventional information processors, upon removing the secondary memories, the information recorded in the secondary memories is rendered not useable by setting different passwords (hereinafter referred to as "secondary password") for the secondary memories themselves.

With the conventional information processors and the information processing systems, however, there are often cases that operators do not set passwords for startup to save a tiresome setting up operation of passwords. There were also many cases of not setting secondary passwords for the secondary memories. Therefore, there exist great risks of information leakage for the above reasons.

On the other hand, there are often cases in which an information processor is used only in a combination with a display device, and without connecting an ordinary keyboard. There are such cases with automated teller machines at shop fronts of banks, shopping information machines announcing services on shopping floors, and the like. In such cases operators take desired information and guidance by simply inputting supplementary information with ancillary input devices as touch panels integrated to display devices, and without input devices such as the regular keyboards. Furthermore, there are also many such cases for automated continuous presentation of a store guide and explanation of merchandise at shop fronts that do not use even the above-referred touch panels, let alone the input devices like keyboards. In any of these information processing systems, although it is necessary to set passwords beforehand to prevent an information processor and a secondary memory from leaking stored information, it is tiresome for a worker to input a startup password and a secondary password with a keyboard, for the processing system and for the secondary memory every time before starting. This does not contribute to efficiency of the workers. However, without keyboard as means of inputting the passwords, this makes the information processor not only impossible to start, but also unable to use even necessary information stored in the secondary memory.

The present invention, therefore, is intended to avoid an annoying work for the operator to input the passwords at each time as stated above, and to minimize the risk of information leakage in case the main unit or the secondary memory of the information processor is stolen. That is, the information processor and the information processing system are started regardless of presence or absence of passwords, when an input device capable of handling input of the passwords is not connected, even if the passwords are set in them. On the other hand, the information processor and the information processing system are started only when the passwords are correctly input with the original input device or another input device, if there are the passwords set in them. Consequently, the present invention prevents the information from illegitimate use while it improves convenience of the operator.

SUMMARY OF THE INVENTION

In order to achieve the above-stated object, an information processing system of the present invention comprises:
  (a) a main unit of information processor;
  (b) an input means detachable from the main unit of the information processor, for setting a startup password used for starting the main unit of the information processor;
  (c) a startup password storage means for storing the startup password set by the input means;
  (d) a startup password presence checking means for determining whether or not the startup password is stored in the startup password storage means; and
  (e) a startup password request means for requesting an operator to set a startup password, wherein:
    (i) the startup password request means requests setting a startup password by the input means for starting the main unit of the information processor, if the input means is connected to the main unit, and when a result of determination of the startup password presence checking means indicates absence of the startup password;
    (ii) the main unit of the information processor is turned into a starting mode, if the input means is connected to the main unit of the information processor, and when the result determined by the startup password presence checking means indicates presence of the startup password; and
    (iii) the main unit of the information processor is turned into a starting mode irrespective of the result determined by the startup password presence checking means as to whether the password is present or absent, if the input means is not connected to the main unit of the information processor.

Furthermore, to achieve the above object in an information processing system having a main unit of information processor and an input means detachable from the main unit of the information processor, a method of processing information comprises the steps of:
  (a) setting a startup password by the input means for starting the main unit of the information processor;
  (b) storing the above-set startup password;
  (c) determining presence or absence of the startup password in storage; and
  (d) requesting an operator to set a startup password, whereby:

(i) executing the step (d), if the input means is connected to the main unit of the information processor, and when a result of determination in the step (c) indicates absence in storage;

(ii) turning the main unit of the information processor into a startup mode, if the input means is connected to the main unit of the information processor, and when the result of determination in the step (c) indicates presence in storage; and (iii) turning the main unit of the information processor into a startup mode irrespective of the result of determination in the step (c), if the input means is not connected to the main unit of the information processor.

DETAILED DESCRIPTION OF THE PREFERRED EMBODIMENT

Figure 1:
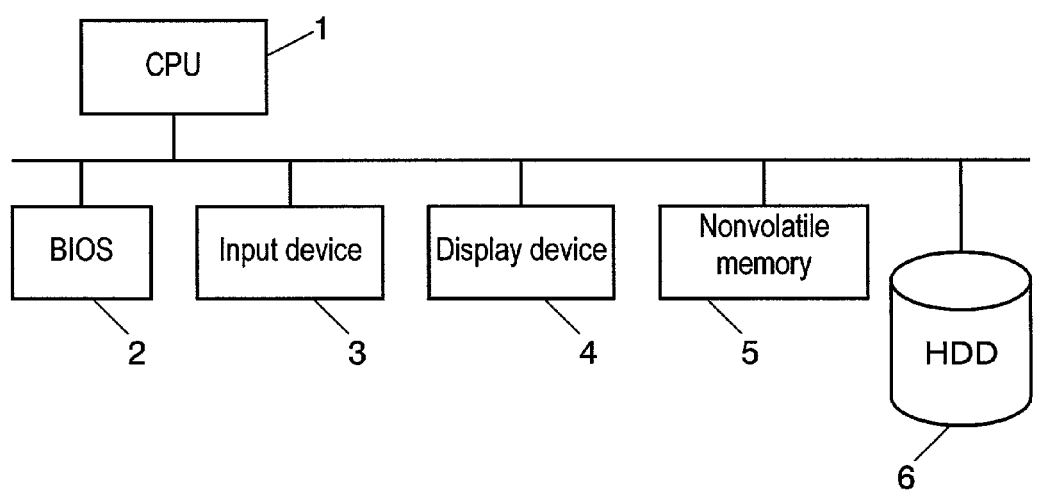
FIG. 1 is a block diagram representing an information processing system of an exemplary embodiment according to the present invention.

An exemplary embodiment of the present invention will be described hereinafter with reference to FIG. 1 and FIG. 2. FIG. 1 is a block diagram of an information processing system of this exemplary embodiment.

In FIG. 1, the information processing system comprises a central processing unit (CPU) 1 for controlling the entire system, a basic input-output system (BIOS) 2 representing a program to be executed first for initialization and so on of the information processing system when a power supply in the information processing system is turned on, a detachable input device 3 defining an input means such as a keyboard for inputting a password and the like, a display device 4 for displaying a password input screen and the like, a nonvolatile memory 5 for storing the password and so on, and a secondary memory 6 such as a hard disk drive (HDD).

A main unit of the information processor comprises, in general, the central processing unit (CPU) 1, the basic input-output system (BIOS) 2, the nonvolatile memory 5 for storing the password and the like, and the secondary memory 6 such as a hard disk drive (HDD).

The display device 4, which displays the password input screen and the like, defines display means such as a CRT, a liquid crystal display, and the like. In one case, the display device 4 it is integrated into the main unit of the information processor, and it may be separated from the main unit of the information processor in another case. In addition, the display device 4 may include an ancillary input means such as a touch panel for inputting supplementary information.

The secondary memory 6 may be comprised of any such means as a floppy disk drive (FDD), a compact disk read only memory device (CD-ROM), a compact disk recording device (CD-R), a compact disk read/write device (CD-R/W), a compact disk random access memory device (CD-RAM), a digital video disk read only memory device (DVD-ROM), a digital video disk recording device (DVD-R), a digital video disk read/write device (DVD-R/W), a digital video disk random access memory device (DVD-RAM), a digital tape recording device, or the like, besides the hard disk drive (HDD). Moreover, there may be such cases that the secondary memory 6 is integrated into the main unit of the information processor, and it is separated from the main unit of the information processor in a removable manner. Furthermore, the secondary memory 6 is normally removable even if it is integrated with the main unit of the information processor.

Figure 2:
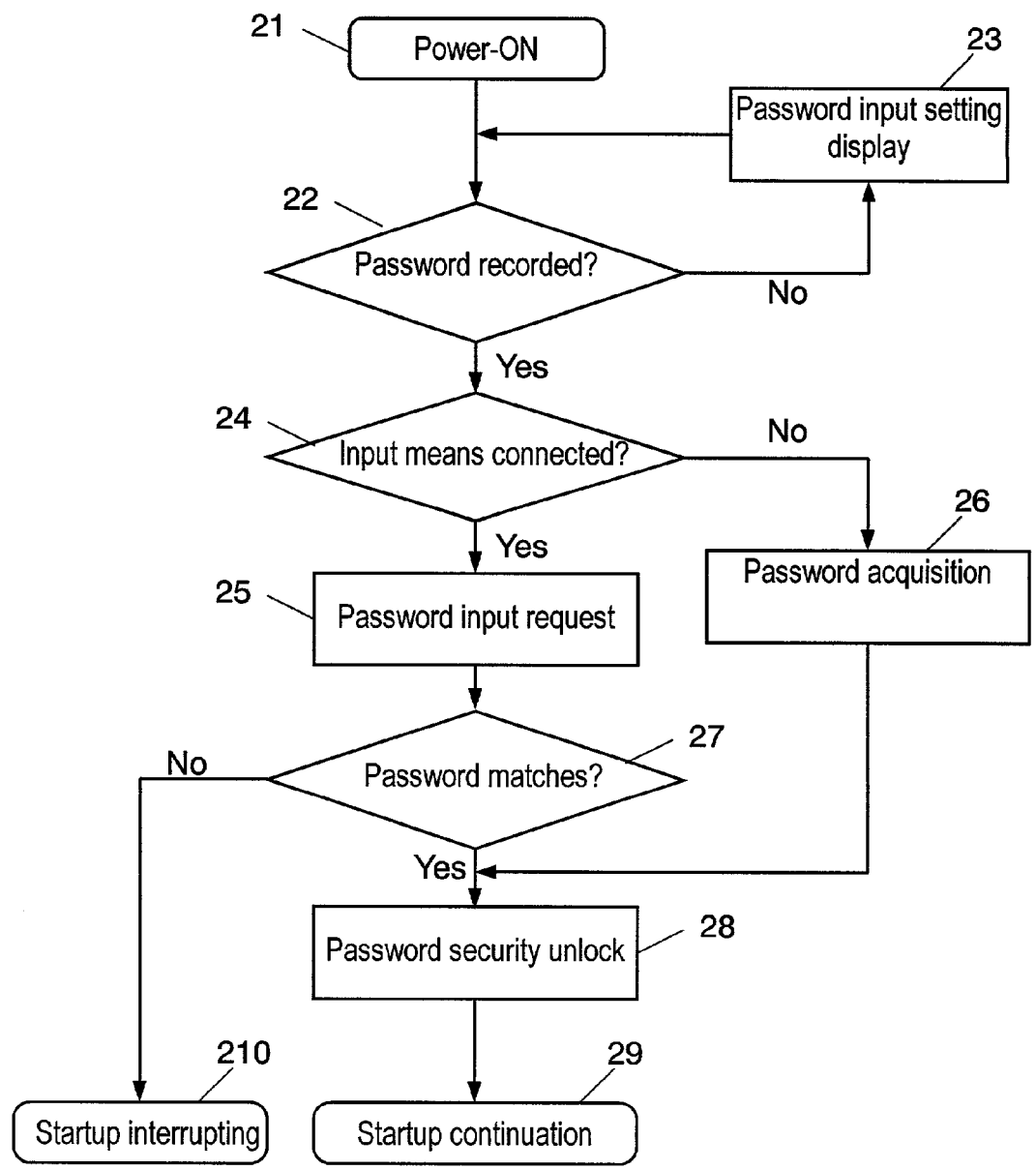
FIG. 2 is a process flowchart during startup of a basic input-output system (BIOS) of the information processing system of the exemplary embodiment according to this invention.

FIG. 2 is a process flowchart during startup of the basic input-output system (BIOS) 2 in the present exemplary embodiment.

In FIG. 2, a power-on step 21 is for turning on the power supply of the information processing system. The information processing system then starts executing the basic input-output system (BIOS) 2. A recorded password check step 22, CPU 1 checks the nonvolatile memory 5 and the secondary memory 6, and CPU 1 determines whether or not the startup password for starting the information processing system, and the secondary password for the secondary memory 6 are stored in either of them. If the startup password and the secondary password are stored in any of the nonvolatile memory 5 and the secondary memory 6, the system passes on to an input means check step 24. If the startup password and the secondary password are not stored in the nonvolatile memory 5 and the secondary memory 6, the system passes on to a password setting display step 23, displays a startup password and secondary password setting screen in the display device 4, such as a CRT or a liquid crystal display representing the display means, and urges the operator to set a startup password and a secondary password. In this password setting display step 23 here, the display device 4 may be substituted by a vocal means, in place of the screen display, to produce vocal sounds for urging the operator to set the startup password and the secondary password with the voice.

The input means check step 24 is for detecting whether or not the input device 3, or the input means, such as a keyboard, for example, is connected to the main unit of the information processor. The state of the system goes on to a password input request step 25, if the input device 3 is connected to the main unit of the information processor. If no input device 3 is connected to the main unit of the information processor, the state of the system goes on to a password acquisition step 26, and acquires the secondary password for the secondary memory 6 stored in the nonvolatile memory 5. Then, the state of the system goes on to a password security unlock step 28. The password input request step 25 is materialized by displaying a password input setting screen in the display device 4, or the display means such as a CRT, a liquid crystal display and the like, for instance. The state of the system goes on to a password matching step 27 when the operator inputs a startup password according to the password input setting screen.

Here, a vocal means may be used in place of the display means to urge the operator to set the startup password with the voice.

The password matching step 27 checks whether or not the startup password and the secondary password input in the password input request step 25 match with the startup password and the secondary password for the secondary memory 6, stored in the nonvolatile memory 5 and the secondary memory 6. If the input secondary password is in agreement with the secondary password stored in the nonvolatile memory 5 and the secondary memory 6 the system goes on to the password security unlocking step 28. If the input secondary password are not in agreement with those stored in the nonvolatile memory 5 and the secondary memory 6, the system goes on to a startup process interrupting step 210, where the lack of agreement interrupts a starting process of the entire information processing system or the main unit of the information processor.

The password security unlocking step 28 is for setting within the secondary memory 6 either the startup password which is input in the password input request step 25, or the secondary password acquired in the password step 26. That is, the password security unlocking step 28 unlocks the security lock of the main unit of the information processor and the information processing system based on the startup password, in the case input device 3 is connected and the correct startup password is input by the operation. The password security unlocking step 28 also unlocks the security lock of the main unit of the information processor and the entire information processing system based on the acquired secondary password from the password acquisition step 26. Upon unlocking the security lock, the system goes on to a startup process continuation step 29 to continue the starting process of the entire information processing system or the main unit of the information processor.

If the secondary memory 6 is removed, and then connected to another information processor of the same model, but different from the main unit of the information processor in which the secondary password is set, this other information processor checks whether or not the secondary password for this removed secondary memory 6 is stored in a nonvolatile memory 5 within the another information processor and the removed secondary memory 6. If the secondary password is stored in the nonvolatile memory 5 and the secondary memory 6, the state of the system goes on to the input means check step 24. If the secondary password is not stored in the nonvolatile memory 5 of the another information processor and the secondary memory 6, the system goes on to a password input setting display step 23, and displays a startup password and a secondary password setting screen in a display device 4, defining display means such as a CRT or a liquid crystal display, and urges the operator to set a secondary password. At this step, an illegitimate operator is able merely to input a random startup password and a random secondary password, since he/she has no knowledge of the secondary password especially for this removed secondary memory 6. Thus, the random secondary password input here cannot match with the secondary password stored in the nonvolatile memory 5 and the secondary memory 6 except for an accidental case. The state hence goes on to the startup-process interrupting step 210, where the input of random passwords result in interrupting the starting process of the entire information processing system or the main unit of the information processor. Accordingly, this contrivance protects the information stored in the removed secondary memory from unfair use.

Further, when the main unit of the information processor and the secondary memory 6 are removed together, and connected to another display device different from the original one, the information stored in the secondary memory 6 becomes readable only through this other display so long as no input device is connected. However, the illegitimate operator cannot tamper with the information itself stored in the secondary memory 6, and also he/she cannot use it unfairly for any other purposes and means. Since this fact has been made clear in the foregoing explanation, further details will be skipped here.

As has been described in detail above, the information processing system of the present invention avoids the inconvenience of inputting the password every time the operator uses it, since the information processor starts automatically, so as to thereby display automatically the information stored in the secondary memory 6 in the display device 4, when the input device 3 is not connected to the information processor. In addition, the present invention can minimize the risk of information leakage if the information processor, the secondary memory, and the like are stolen. In other words, if there is a password set with it, and if it is not connected with an input device capable of inputting a password, it starts the information storage device irrespective of the presence or absence of the password, and provides the display device with the information of the secondary memory, thereby improving convenience of the operator. Moreover, if there is no password set during a startup or for the secondary memory, this contrivance can offer better security for the information stored in the secondary memory by not starting the device, or by not unlocking the password protection for the secondary memory. Furthermore, if there is a password set with it, this contrivance of the present invention starts the information storage device and provides the display device with the information of the secondary memory, only when the password is correctly input with a different input device, so as to reduce possibility of the information leakage.

What is claimed is:

1. An information processing system comprising:
   a main unit of an information processor;
   an input means detachable from said main unit of the information processor, said input means for setting a startup password used for starting said main unit of the information processor;
   a startup password storage means for storing the startup password set by said input means;
   a startup password presence checking means for determining whether or not the startup password is stored in said startup password storage means; and
   a startup password request means for requesting an operator to set the startup password, wherein:
   (i) said startup password request means requests the operator to set the startup password by said input means, if said input means is connected to said main unit and said startup password presence checking means determines that the startup password is absent;
   (ii) said main unit of the information processor enters a starting mode upon verification that a password entered via said input means corresponds to the startup password, if said input means is connected to said main unit of the information processor and said startup password presence checking means determines that the startup password is present; and
   (iii) said main unit of the information processor enters the starting mode regardless of whether said startup password presence checking means determines that the startup password is present or absent, if said input means is not connected to said main unit of the information processor.

2. The information processing system as set forth in claim 1, wherein said main unit of the information processor comprises:
   a startup condition storage means for storing a startup condition for starting said main unit of the information processor regardless of whether said startup password presence checking means determines that the startup password is present or absent;
   a startup condition judging means for making a judgement as to whether or not the startup condition stored in said startup condition storage means is satisfied; and
   a main unit starting means for starting said main unit of the information processor when said startup condition judging means judges that the startup condition is satisfied.

3. The information processing system as set forth in any of claim 1, wherein:
said main unit of the information processor further comprises an input means connection detecting means for detecting whether or not said input means is connected to said main unit of the information processor; and
said input means connection detection means detects that said input means is not connected to said main unit of the information processor, a startup condition for said main unit of the information processor is satisfied.

4. The information processing system as set forth in claim 1, wherein said startup password request means includes a display means.

5. The information processing system as set forth in claim 4, wherein said display means includes a supplementary input means provided with a touch panel.

6. The information processing system as set forth in claim 1, wherein said startup password request means includes a voice generation means for requesting setting of the startup password with vocal sound produced by said voice generation means.

7. A method of processing information for an information processing system having a main unit of an information processor and an input means detachable from the main unit of the information processor, said method comprising:
detecting whether or not a startup password is stored in the information processing system;
requesting an operator to set the startup password, if the input means is connected to the main unit of the information processor, and said detecting detects that the startup password is absent;
entering the main unit of the information processor into a startup mode upon verification that a password entered via the input means corresponds to the startup password, if the input means is connected to the main unit of the information processor, and said detecting detects that the startup password is present; and
entering the main unit of the information processor into the startup mode regardless of whether said detecting detects that the startup password is present or absent, if the input means is not connected to the main unit of the information processor.

8. The method of processing information as set forth in claim 7, wherein:
a startup condition for starting the main unit of the information processor regardless of whether said detecting detects that the startup password is present or absent is stored in the main unit of the information processor; and
the method of processing information further comprises:
determining whether or not the startup condition is satisfied; and
starting the main unit of the information processor when the startup condition is satisfied.

9. The method of processing information as set forth in claim 7, further comprising:
detecting whether or not the input means is connected to the main unit of the information processor; and
starting the main unit of the information processor under a condition when said detecting of whether or not the input means is connected detects that the input means is not connected to the main unit of the information processor.

10. The method of processing information as set forth in claim 7, wherein said requesting comprises displaying a request for setting the startup password in a display screen.

11. The method of processing information as set forth in claim 10, further comprising inputting supplementary information by means of a display screen touched by the operator.

12. The method of processing information as set forth in claim 7, wherein said requesting comprises requesting the operator to set the startup password with vocal sound.

13. The information processing system as set forth in claim 2, wherein:
said main unit of the information processor further comprises an input means connection detecting means for detecting whether or not said input means is connected to said main unit of the information processor; and
when said input means connection detection means detects that said input means is not connected to said main unit of the information processor, the startup condition for said main unit of the information processor is satisfied.

14. The information processing system as set forth in claim 2, wherein said startup password request means includes a display means.

15. The method of processing information as set forth in claim 8, further comprising:
detecting whether or not the input means is connected to the main unit of the information processor; and
starting the main unit of the information processor under a condition when said detecting of whether or not the input means is connected detects that the input means is not connected to the main unit of the information processor.

16. The method of processing information as set forth in claim 8, wherein said requesting comprises displaying a request for setting the startup password in a display screen.

17. The method of processing information as set forth in claim 8, wherein said requesting comprises requesting the operator to set the startup password with vocal sound.

* * * * *

UNITED STATES PATENT AND TRADEMARK OFFICE
CERTIFICATE OF CORRECTION

PATENT NO. : 7,051,214 B2  Page 1 of 1
APPLICATION NO. : 09/842187
DATED : May 23, 2006
INVENTOR(S) : Takashi Kobayashi It is certified that error appears in the above-identified patent and that said Letters Patent is hereby corrected as shown below:

IN THE CLAIMS

In column 7, lines 1 and 2, please delete "any of".

Signed and Sealed this

Fourteenth Day of November, 2006

JON W. DUDAS
*Director of the United States Patent and Trademark Office*